(12) United States Patent
Escude et al.

(10) Patent No.: US 10,652,305 B2
(45) Date of Patent: May 12, 2020

(54) HIGH AVAILABILITY VOICE OVER INTERNET PROTOCOL TELEPHONY

(71) Applicant: PrimeVOX Communications, LLC, Farmers Branch, TX (US)

(72) Inventors: Luke Escude, Dallas, TX (US); Jared Hull, Lake Jackson, TX (US)

( * ) Notice: Subject to any disclaimer, the term of this patent is extended or adjusted under 35 U.S.C. 154(b) by 11 days.

(21) Appl. No.: 16/104,741

(22) Filed: Aug. 17, 2018

(65) Prior Publication Data

US 2020/0059508 A1    Feb. 20, 2020

(51) Int. Cl.
*H04L 12/16* (2006.01)
*H04L 29/06* (2006.01)
*H04M 7/12* (2006.01)
*H04L 29/08* (2006.01)

(52) U.S. Cl.
CPC ............ *H04L 65/80* (2013.01); *H04L 65/104* (2013.01); *H04L 65/105* (2013.01); *H04L 65/1053* (2013.01); *H04L 65/1059* (2013.01); *H04L 67/1095* (2013.01); *H04M 7/124* (2013.01)

(58) Field of Classification Search
None
See application file for complete search history.

(56) References Cited

U.S. PATENT DOCUMENTS

| 9,521,029 | B2 * | 12/2016 | Layman | H04L 41/0659 |
| 2008/0037565 | A1 * | 2/2008 | Murray | H04M 3/5307 370/401 |
| 2008/0037715 | A1 * | 2/2008 | Prozeniuk | H04M 11/04 379/45 |
| 2011/0134804 | A1 * | 6/2011 | Maes | H04M 7/0012 370/259 |
| 2012/0184277 | A1 * | 7/2012 | Hiltunen | H04W 36/30 455/437 |
| 2018/0052968 | A1 * | 2/2018 | Hickle | H04M 3/5116 |
| 2019/0281465 | A1 * | 9/2019 | Moshir | H04L 63/0428 |
| 2019/0320070 | A1 * | 10/2019 | Adams | H04M 3/4234 |

* cited by examiner

*Primary Examiner* — Brandon M Renner
(74) *Attorney, Agent, or Firm* — John Lindsay

(57) ABSTRACT

The present invention is directed to processes and systems for high availability Voice Over Internet Protocol telephony. Exemplary embodiments comprise a VOIP proxy cluster in communication with an IP private branch exchange cluster in communication with a PSTN VOIP gateway cluster, all at a first call cluster locale. In exemplary configuration, nodes within each of the clusters mount a database node from the database cluster, and store and retrieve persistent telephony operation data within the database cluster. Embodiments employ the clustering mechanisms to separate telephony elements in a cluster to cluster topology. In exemplary usage, multiple physically separate call cluster locales are deployed for higher availability.

20 Claims, 9 Drawing Sheets ously several embodiments of the invention, it is to be understood

HIGH AVAILABILITY VOICE OVER INTERNET PROTOCOL TELEPHONY

BACKGROUND

Field of the Invention

The present invention relates to telephony, more specifically to Voice Over Internet Protocol telephony.

Description of the Related Art

Reliability is important in telephony, especially in business or safety settings. In Voice Over Internet Protocol (VOIP) telephony, server failures, network connections, power outages, natural disasters, and other factors can often result in system downtime, making telephone calls unavailable. It would be desirable to implement a system which minimizes downtime, and minimizes recovery time in the case of downtime.

SUMMARY

The present invention is directed to processes and systems for high availability Voice Over Internet Protocol telephony. Exemplary embodiments comprise a VOIP proxy cluster in communication with an IP private branch exchange cluster in communication with a PSTN VOIP gateway cluster, all at a first call cluster locale. In exemplary configuration, nodes within each of the clusters mount a database node from the database cluster, and store and retrieve persistent telephony operation data within the database cluster. Embodiments employ the clustering mechanisms to separate telephony elements in a cluster to cluster topology. In exemplary usage, multiple physically separate call cluster locales are deployed for higher availability.

These and other features, aspects, and advantages of the invention will become better understood with reference to the following description, appended claims, and accompanying drawings.

DETAILED DESCRIPTION

While the foregoing detailed description has disclosed several embodiments of the invention, it is to be understood that the above description is illustrative only and not limiting of the disclosed invention. It will be appreciated that the discussed embodiments and other unmentioned embodiments may be within the scope of the invention.

The invention is directed to systems and processes for high availability Voice Over Internet Protocol telephony (VOIP). The systems and processes enable high availability and low recovery time from failover as each layer includes a cluster mechanism and health monitoring for failure.

Certain embodiments are carried out on servers. As used in the present disclosure, the term server or computer is intended to encompass any suitable processing device. For example, the environment may be implemented using one or more servers, including a server pool. Indeed, a server and client system may be any computer or processing device such as, for example, a blade server, general-purpose personal computer (PC), Macintosh, workstation, UNIX-based workstation, mobile phone, tablet, or any other suitable device. In other words, the present disclosure contemplates computers other than general purpose computers, as well as computers without conventional operating systems. Certain nodes 22 32 42 52 may be implemented as a virtual machines or containers. A virtual machine a virtual machine is an emulation of a computer system, such as a system virtual machine or process virtual machine. Virtual machines are based on computer architectures and provide functionality of a physical computer. Their implementations may involve specialized hardware, software, or a combination. Representative virtual machines include Hyper-V, VirtualBox, VMWare, and others known in the art. A container refers to an operating system feature in which the kernel allows the existence of multiple isolated user-space instances. Representative containerization include Docker, Kubernets, Apache Mesa, and others known in the art.

Figure 1:
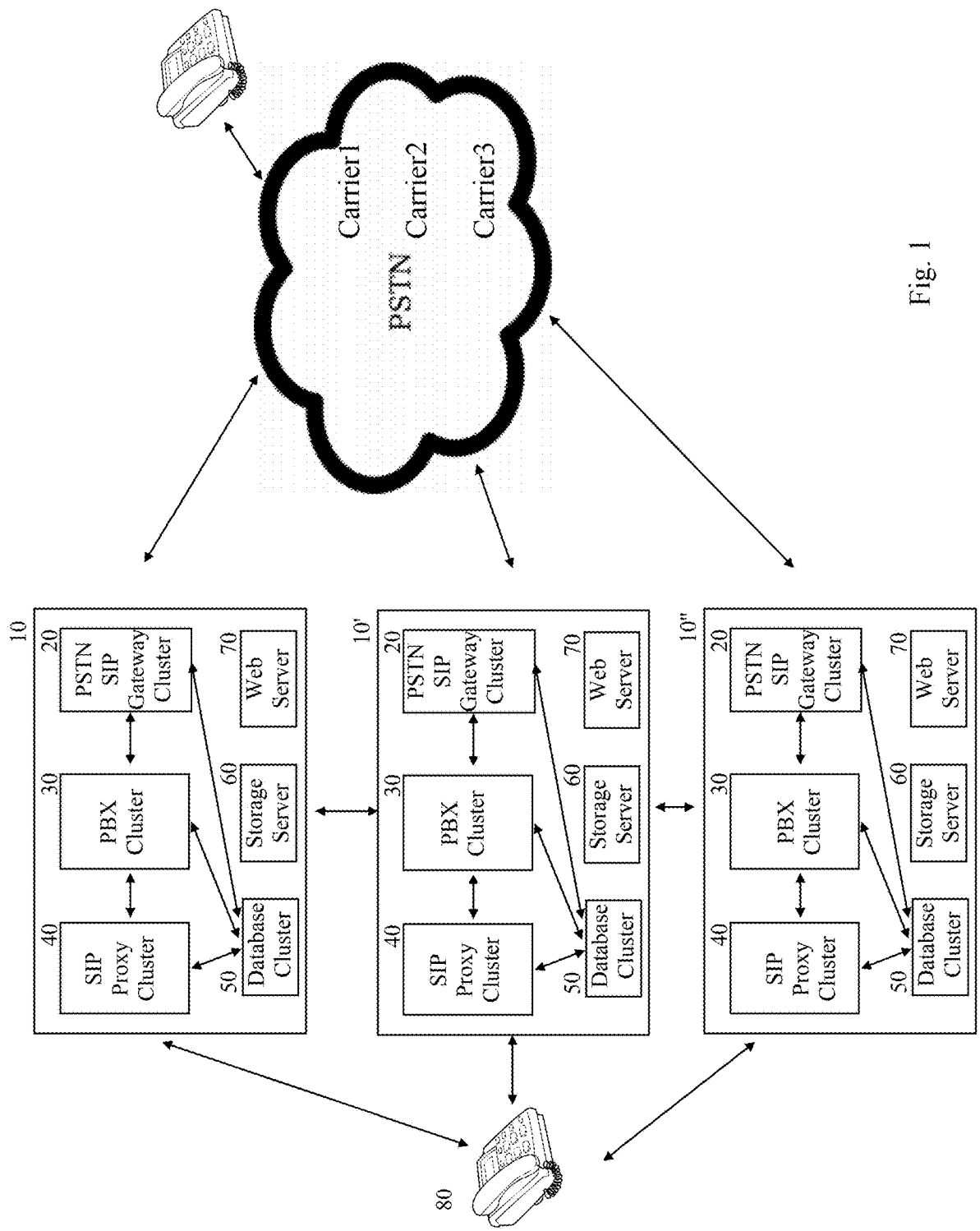
FIG. 1 depicts a diagram of an embodiment of a system according to the current invention as it may exist in operation.
Figure 2:
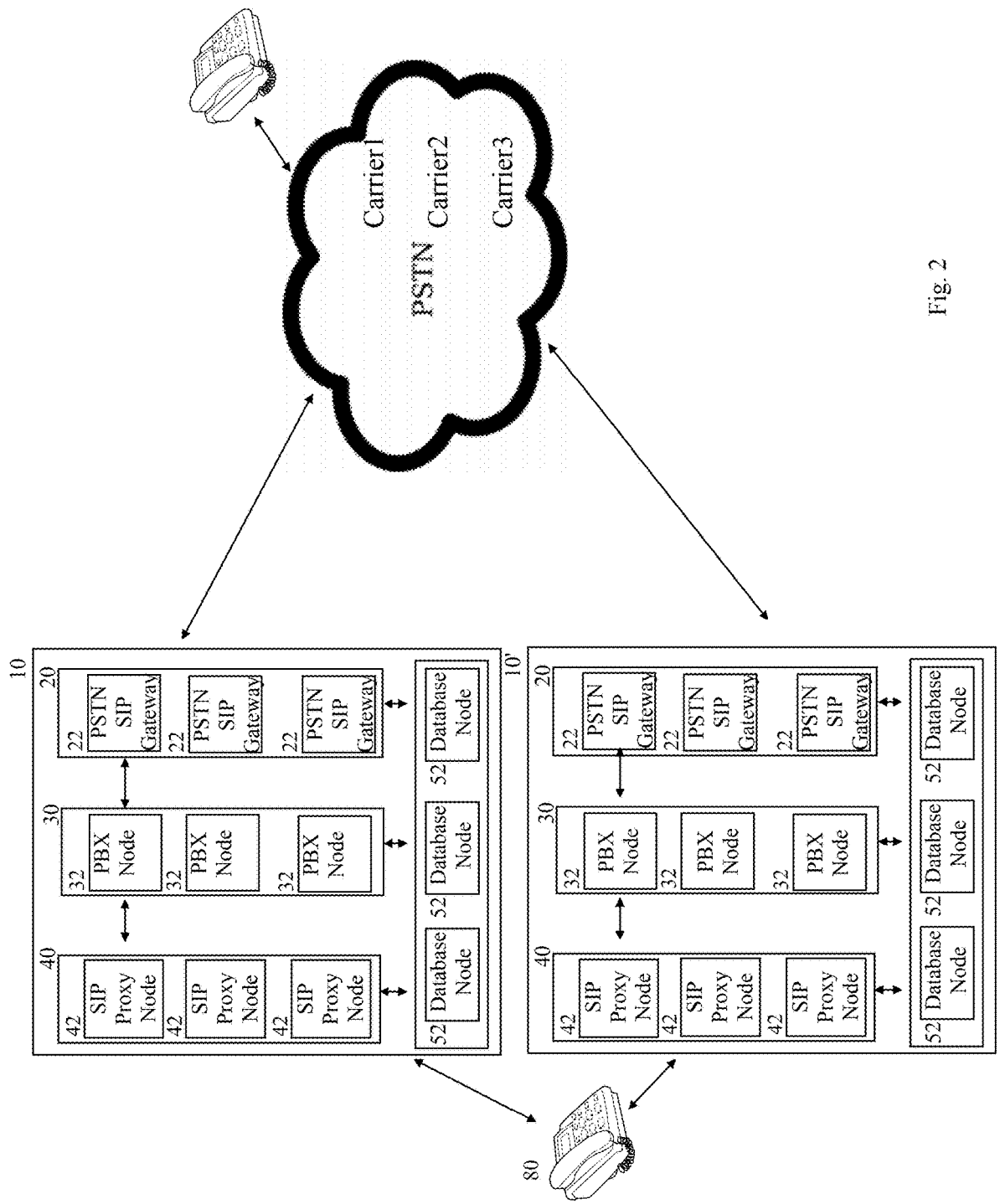
FIG. 2 depicts a diagram of an embodiment of a system according to the current invention as it may exist in operation.
Figure 3:
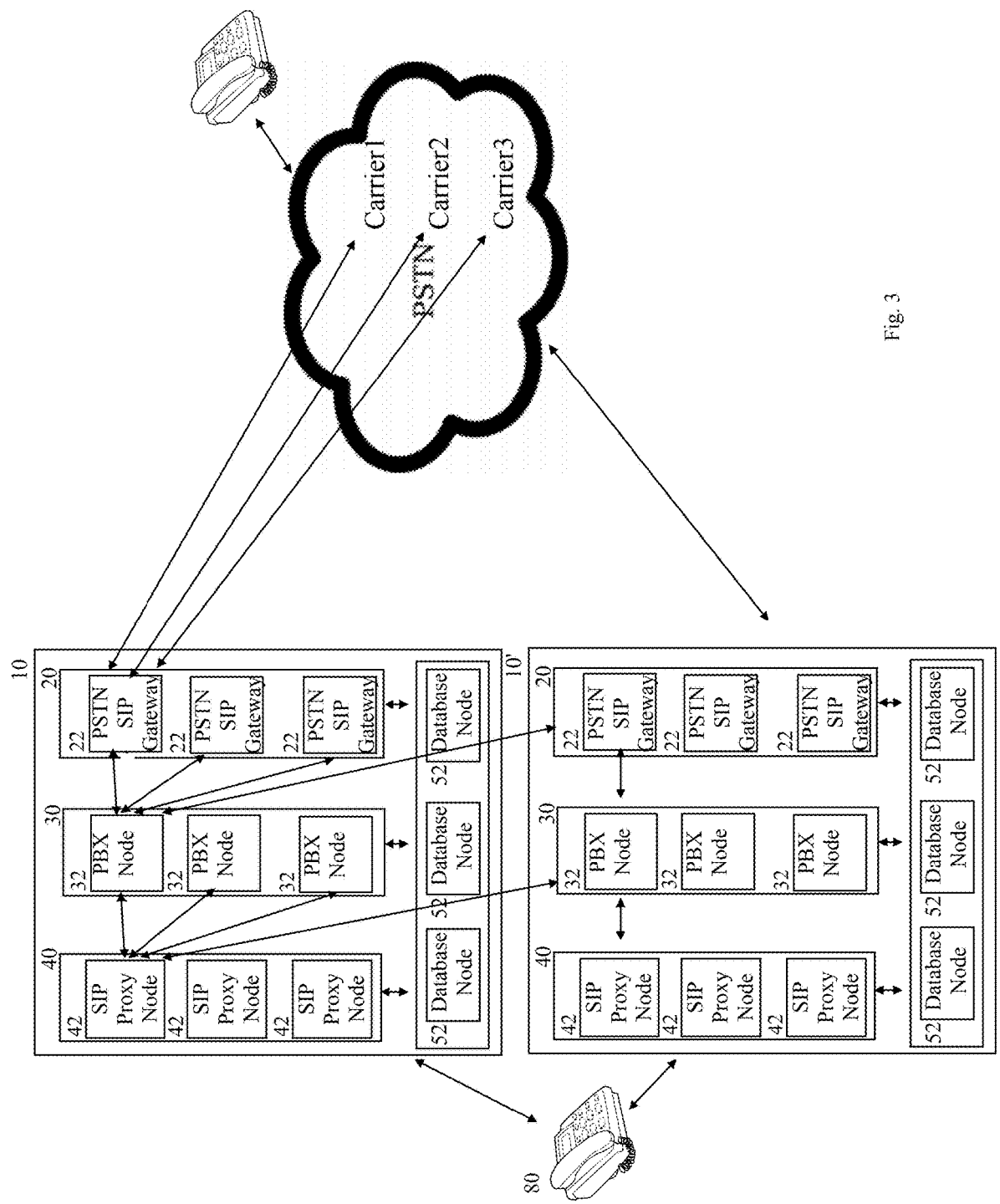
FIG. 3 depicts a diagram of an embodiment of a system according to the current invention as it may exist in operation.
Figure 7:
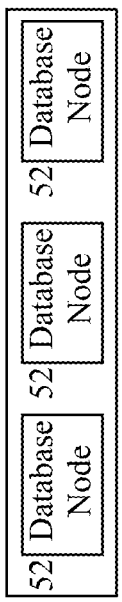
FIG. 7 depicts a diagram of a database node cluster.
Figure 6:
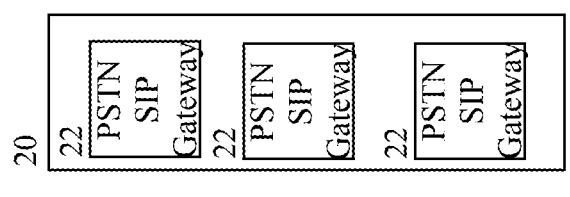
FIG. 6 depicts a diagram of a PSTN VOIP gateway node cluster.
Figure 5:
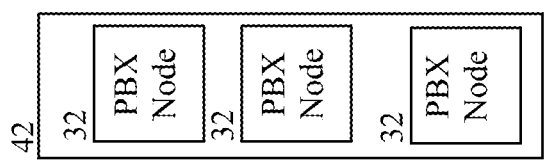
FIG. 5 depicts a diagram of a PBX node cluster.
Figure 4:
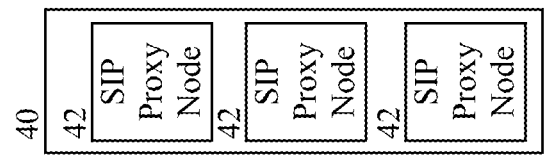
FIG. 4 depicts a diagram of a VOIP proxy node cluster.

FIGS. 1-3 depict embodiments of systems of the invention as they may exist in operation. Illustrated are call cluster locales 10 in communication with phones 80 and each having a VOIP phone proxy cluster 40, a IP private branch exchange (PBX) cluster 30, a PSTN VOIP gateway cluster 20, and a database cluster 50. Embodiments employ the clustering mechanisms to separate telephony elements in a cluster to cluster topology, increasing availability. In exemplary usage, multiple physically separate call cluster locales 10 may be deployed.

FIGS. 1-3 and FIG. 7 illustrate an exemplary database cluster 50. The illustrated database cluster 50 includes a plurality of database nodes 50, each database node 52 being an instance on a server, virtual machine, container, or the like. In certain configurations, minimal information is stored directly in SIP proxy nodes 42, PBX nodes 32, or PSTN SIP gateways 22. Instead telephony state information is stored and retrieved from a database node 52. Each database node 52 is operable to provide storage and retrieval for telephony operations such as telephone numbers, telephone call processing, voicemail, telephone 80 state, telephone registration state, SIP proxy node 42 state, call routing information, PBX node 32 state, call queues, PSTN SIP gateway node 22 state, and other information. One skilled in the art would appreciate that the data may reside in one or more databases, tables, or computers. Representative suitable database node 52 systems include MySQL, MariaDB, PostgreSQL, SQLite, Microsoft SQL Server, Cassandra, MongoDB, SDBM/Flat File dbm, and others known in the art.

The database nodes 52 are in communication with each other, with each having an identifier, and a clustering mechanism is applied to the database cluster 50, replicating the data in each of the database nodes 52 across the database nodes 52 in the database cluster 52. An exemplary cluster mechanism is one which enables read and write operations to each database node 52 in the database cluster 52, with data commits being replicated out to other database instances with minimal lag after the write request. A further exemplary database cluster mechanism detects which database nodes 52 are unavailable and automatically adjusts the size of the database cluster 52. Representative suitable cluster mechanisms include Galera Cluster, MySQL Clusters, SQL Server Clusters, and others known in the art.

In exemplary process, telephone system settings, customer's extensions, call queue settings, voicemail, call routing, and other telephony state items are stored in the database cluster 52 instead of locally in the SIP proxy cluster 40, PBX cluster 30, or PSTN SIP gateway 20. When a SIP proxy cluster 40, PBX cluster 30, or PSTN SIP gateway 20 is instantiated or in operation, the database cluster 52 is mounted for retrieval of initial state of telephony operations, retrieval of persistent telephony operation state information, and/or storage of persistent telephony operation state information.

Suitable phones 80 to employ for telephony with the call cluster locales 10 are VOIP phones. Suitable VoIP phone or IP phone uses voice over IP technologies for placing and transmitting telephone calls over an IP network, such as the Internet. Exemplary phones 80 employ digital IP-based telephone control protocols such as the Session Initiation Protocol (SIP). It within the scope of this invention to employ other VOIP telephony such as the Media Gateway Control Protocol, H.323, or various other protocols. Exemplary embodiments of the invention include components for telephony to the PSTN. In exemplary operation, phones 80 are provisioned with a list of SIP proxy nodes 42 in the SIP proxy cluster 40. For instance, they can be provisioned with Domain Name Service (DNS-SRV) records containing a list of SIP proxy servers 42 for failover and redundancy. This allows the phones 80 themselves to connect to multiple SIP proxy nodes 42 in one or more SIP proxy clusters 40 in the event of a failure.

FIGS. 1-3 and FIG. 4 illustrate an exemplary VOIP proxy cluster 40. Illustrated is a SIP proxy cluster 40 includes a plurality of SIP proxy nodes 50, each SIP proxy node 50 being an instance on a server, virtual machine, container, or the like. The telephones 80 are in communication with one or more SIP proxy nodes 42. Each SIP proxy node 42 is operable to route SIP requests to user agent servers and route SIP responses to user agent clients, performing telephony functions such as telephone 80 registration, telephone 80 authorization and authentication for services, telephone 80 network access control, outbound call set-up, to route inbound calls and requests to the telephone 80, implement provider call-routing policies, and provide features to users. Representative suitable PSTN SIP gateway nodes 22 include Kamailio, OpenSIPS, and others known in the art.

In exemplary configuration, the SIP proxy nodes 42 are configured to mount one or more database nodes 52 and store and retrieve persistent call locale telephone data from the database cluster 50, leaving primarily just temporal data on the SIP proxy nodes 42 in operation. In exemplary configuration, telephone system settings, telephone extensions, call queue settings, voicemail, and other persistent data is stored and retrieved from the database cluster 50. In other configurations, persistent telephony data is retrieved from the database cluster 50 when the SIP proxy node 42 is instantiated. In other configurations, persistent telephony data from the database cluster 50 is stored to the database while the SIP proxy node 42 is in operation.

The SIP proxy nodes 42 are in communication with each other, with each having an identifier, and a clustering mechanism is deployed to the SIP proxy cluster 40, replicating the data in each of the SIP proxy nodes 42 across the SIP proxy nodes 42 in the SIP proxy cluster 40. An exemplary cluster mechanism is one which synchronizes call session, carrier transaction, and other persistent data across the SIP proxy cluster 40 with minimal lag. In exemplary operation, the SIP proxy cluster 40 cluster mechanism operates in a decentralized mode. Representative suitable cluster mechanisms include Kamailio, Docker Swarm, Kubernetes, Apaches Mesos, and others known in the arts.

FIGS. 1-3 and FIG. 5 illustrate an exemplary PBX cluster 30. The illustrated PBX cluster 30 includes a plurality of IP PBX nodes 32, each PBX node 32 being an instance on a server, virtual machine, container, or the like. Each PBX node 32 is an IP PBX operable to act as a central switching system for telephone 80 calls within a call locale, managing incoming and outgoing telephone calls, switching calls to the appropriate internal telephone line, signaling call start and termination, initiating outbound telephone calls via remote API commands, monitoring status of internal telephone lines, call logging, call statistics, call queueing and provide features such as call recording, call forwarding, voice mail, interactive voice response, conference calls. Each PBX node 32 monitors the availability of its services, and restarts them if they become available. Representative suitable PBX nodes 32 include Asterisk, FreeSwitch, 3CX, and others known in the art.

In exemplary configuration, the PBX node 32 are configured to mount one or more database nodes 52 and store and retrieve persistent call locale telephony data from the database cluster 50, leaving primarily just temporal data on the PBX node 32 in operation. In exemplary configuration, persistent call switching telephony state data such as incoming and outgoing telephone calls, call start and termination signaling, and other persistent data is stored and retrieved from the database cluster 50. In other configurations, persistent telephony data is retrieved from the database cluster 50 when the PBX node 32 is instantiated. In other configurations, persistent telephony data from the database cluster 50 is stored to the database while the PBX node 32 is in operation.

The PBX nodes 32 are in communication with each other, with each having an identifier, and a clustering mechanism is deployed to the PBX node cluster 30, replicating the data in each of the PBX nodes 32 across the PBX nodes 32 in the PBX cluster 30. An exemplary cluster mechanism is one which synchronizes PBX functional modules across the PBX cluster 30 with minimal lag. In exemplary operation, the PBX node cluster 30 cluster mechanism operates in a decentralized mode. Representative suitable cluster mechanisms include Docker Swarm, Kubernetes, Apaches Mesos, and others known in the arts.

FIGS. 1-3 and FIG. 6 illustrate an exemplary PSTN VOIP gateway cluster 20. Illustrated is a PSTN SIP gateway cluster 20 includes a plurality of PSTN SIP gateway nodes 22, each PSTN SIP gateway node 22 being an instance on a server, virtual machine, container, or the like. Each PSTN SIP gateway node 22 bridges the VOIP to PSTN telephony and is operable to communicate with carriers, registering telephone numbers, routing incoming calls from carriers, routing outbound telephone calls from the call locale to the PSTN, and the like. PSTN SIP gateway nodes 22 include a first interface to the VOIP network and a second interface to the PSTN, along with software to translate the communications from both interfaces. Representative suitable PSTN SIP gateway nodes 22 include Kamailio, OpenSIPS, and others known in the art.

In certain configurations, the PSTN SIP gateway nodes 22 include cost routing tables. The least cost routing tables include information such as new price schedule for carrier, number of "hops" for a carrier, call locale 10 call volume to a carrier, historical availability rate data for a carrier, current and recent system availability of a carrier, and other information in order to calculate a routing weight for a call, other factors known in the art. In selecting a route, the PSTN SIP gateway node 22 selects a route based on based on more of the factors of cost, call volume to the carrier, and historical availability. The PSTN SIP gateway node 22 may assign higher weights to individual factors, such as cost or availability. The PSTN SIP gateway nodes 22 routes call based on the routing cost for the particular call, subject to current availability of the carrier. In the case of current unavailability of a carrier may sequentially try to route the call to the next carrier, in order of the cost.

In exemplary configuration, the PSTN SIP gateway nodes 22 are configured to mount one or more database nodes 52 and store and retrieve persistent call locale telephone data from the database cluster 50, leaving primarily only temporal state data on the PSTN SIP gateway nodes 22. In exemplary configuration, call sessions with external telephones, other transactions with carriers, and other persistent data is contemporaneously stored and retrieved from the database cluster 50.

The PSTN SIP gateway nodes 22 are in communication with each other, with each having an identifier, and a clustering mechanism is deployed to the PSTN SIP gateway cluster 20, replicating the data in each of the PSTN SIP gateway nodes 22 across the PSTN SIP gateway nodes 22 in the PSTN SIP gateway cluster 20. An exemplary cluster mechanism is one which synchronizes call session, carrier transaction, and other persistent data across the PSTN SIP gateway cluster 20 with minimal lag. In exemplary operation, the PSTN SIP gateway cluster 20 cluster mechanism operates in a decentralized mode. Representative suitable cluster mechanisms include Kamailio, Docker Swarm, Kubernetes, Apaches Mesos, and others known in the arts.

Figure 8A:
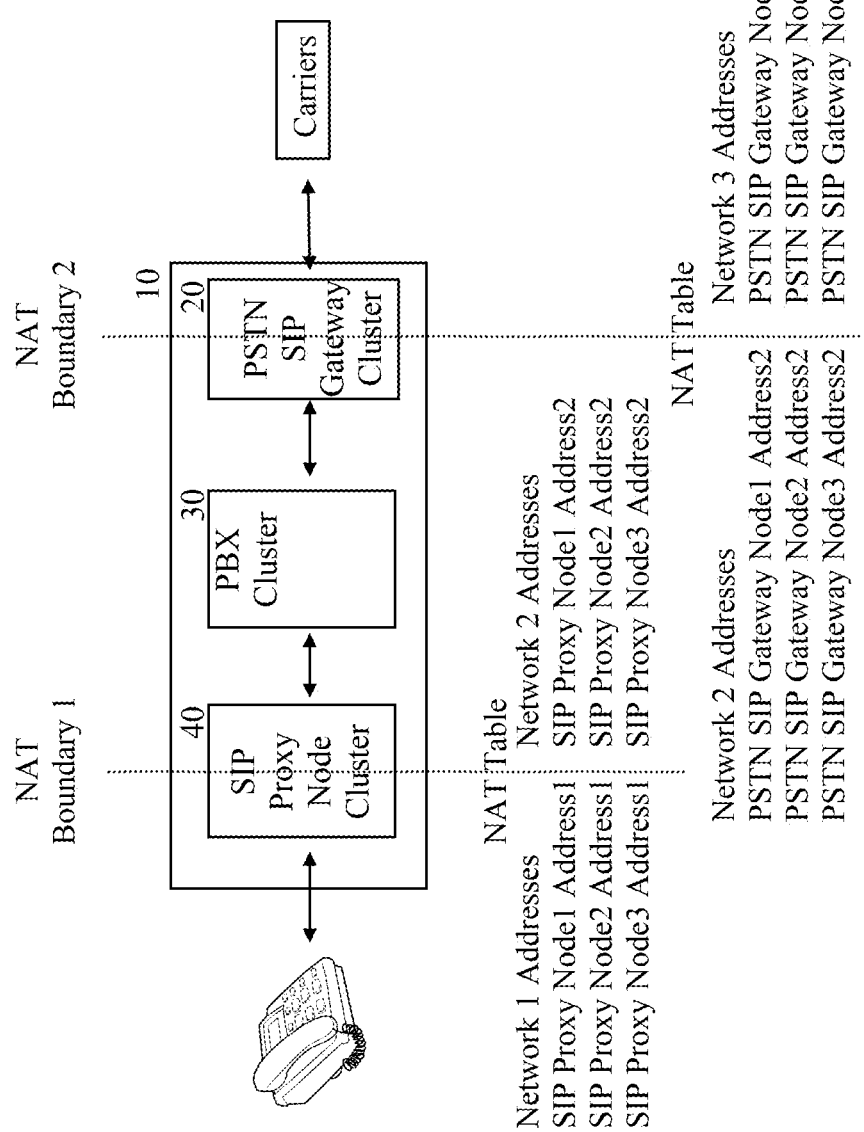
FIGS. 8A and 8B depict of an embodiment of a system with network address translation.
Figure 8B:
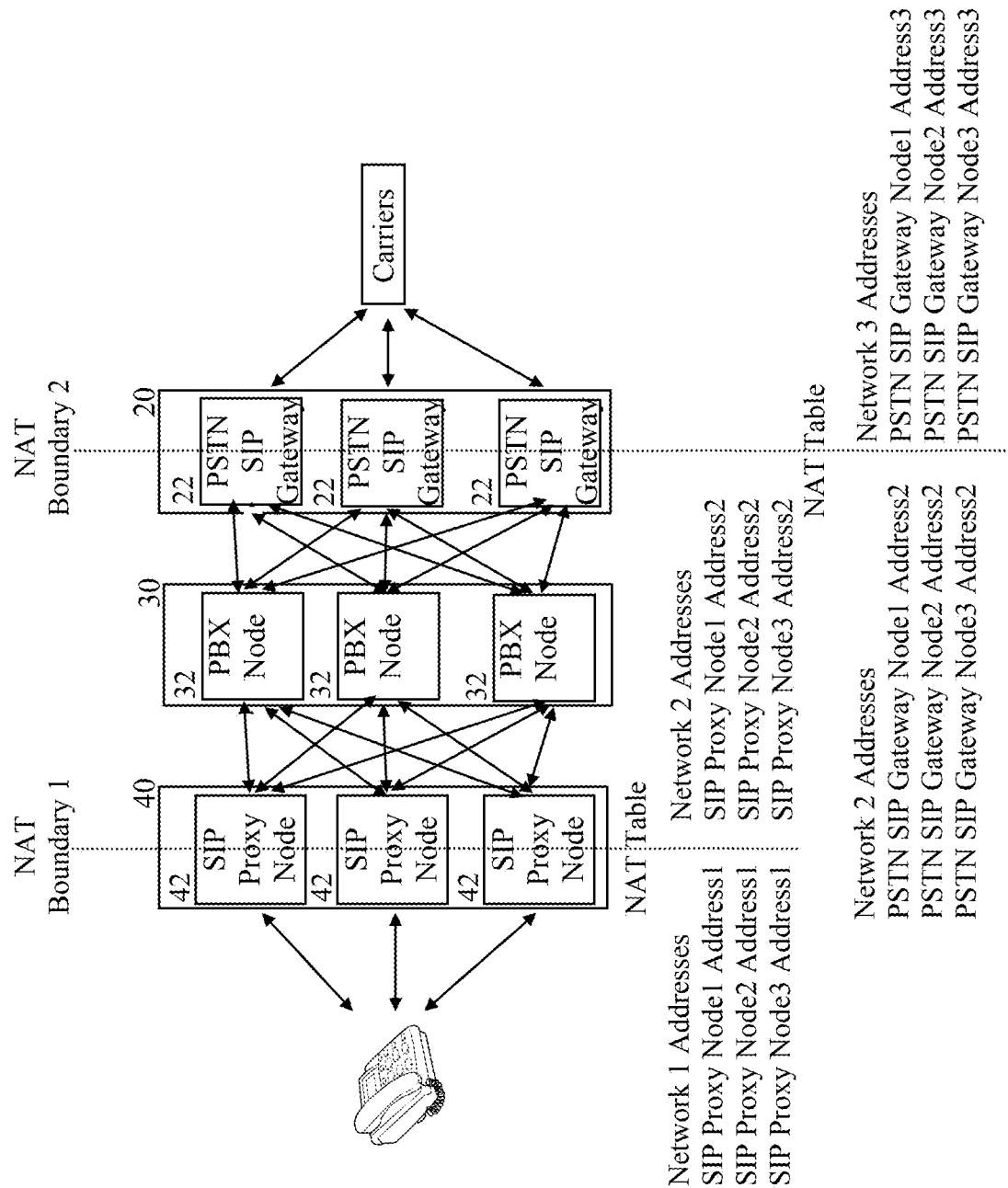

As illustrated in FIGS. 8A and 8B, exemplary embodiments of the invention employ network address translation (NAT), with NAT remapping one IP address space into another by modifying network address information across a network boundary. In certain configurations, a NAT layer is applied across the SIP proxy cluster 40, with the SIP proxy cluster 40 being a network boundary. Each SIP proxy cluster 42 has a first network interface having a first network address, such as an internal network address, and a second network interface having a second network address, such as a public network address. For example, where a SIP proxy node 42 instance is a Docker container, it might have an internal to Docker first network IP address of 192.168.x.x and a second external IP address of 192.168.x.x:yyyy, each recorded in the NAT table. The NAT table is available to the PBX cluster 30, enabling PBX nodes 32 to directly address a SIP proxy node 42. In turn, this enables a mechanism of polling for availability and health of the SIP proxy nodes 32.

In certain configurations, a NAT layer is similarly applied across the PSTN SIP gateway cluster 20, with the PSTN SIP gateway cluster 20 being a network boundary. Each PSTN SIP gateway node 22 has first network interface having a first network address, such as an internal network address, and a second network interface having a second network address, such as a public network address. For example, where a PSTN SIP gateway node 22 instance is a Docker container, it might have an internal to Docker first network IP address of 192.168.x.x and a second external IP address of 192.168.x.x:yyyy, each recorded in the NAT table. The NAT table is available to the PBX cluster 30, enabling PBX nodes 32 to directly address a PSTN SIP gateway node 22. Again, enabling a mechanism of polling for availability and health of the PSTN SIP gateway node 22.

In further configuration, in operation, the PBX nodes 32 periodically poll the PSTN SIP gateway nodes 22 and/or the SIP proxy nodes 42 of the respective NAT tables. During a failure event of a PSTN SIP gateway node 22 or a SIP proxy node 42 due to network, CPU, error states, or other events, the PSTN SIP gateway node 22 or a SIP proxy node 42 becomes unresponsive and is marked as unresponsive, where the instance may be destroyed. A new instance of a PSTN SIP gateway node 22 or a SIP proxy node 42 is created, which creates a new entry in the NAT table, which triggers a transfer of telephone state information from the database cluster 50 to that PSTN SIP gateway node 22 or a SIP proxy node 42, making it operational.

Figure 9:
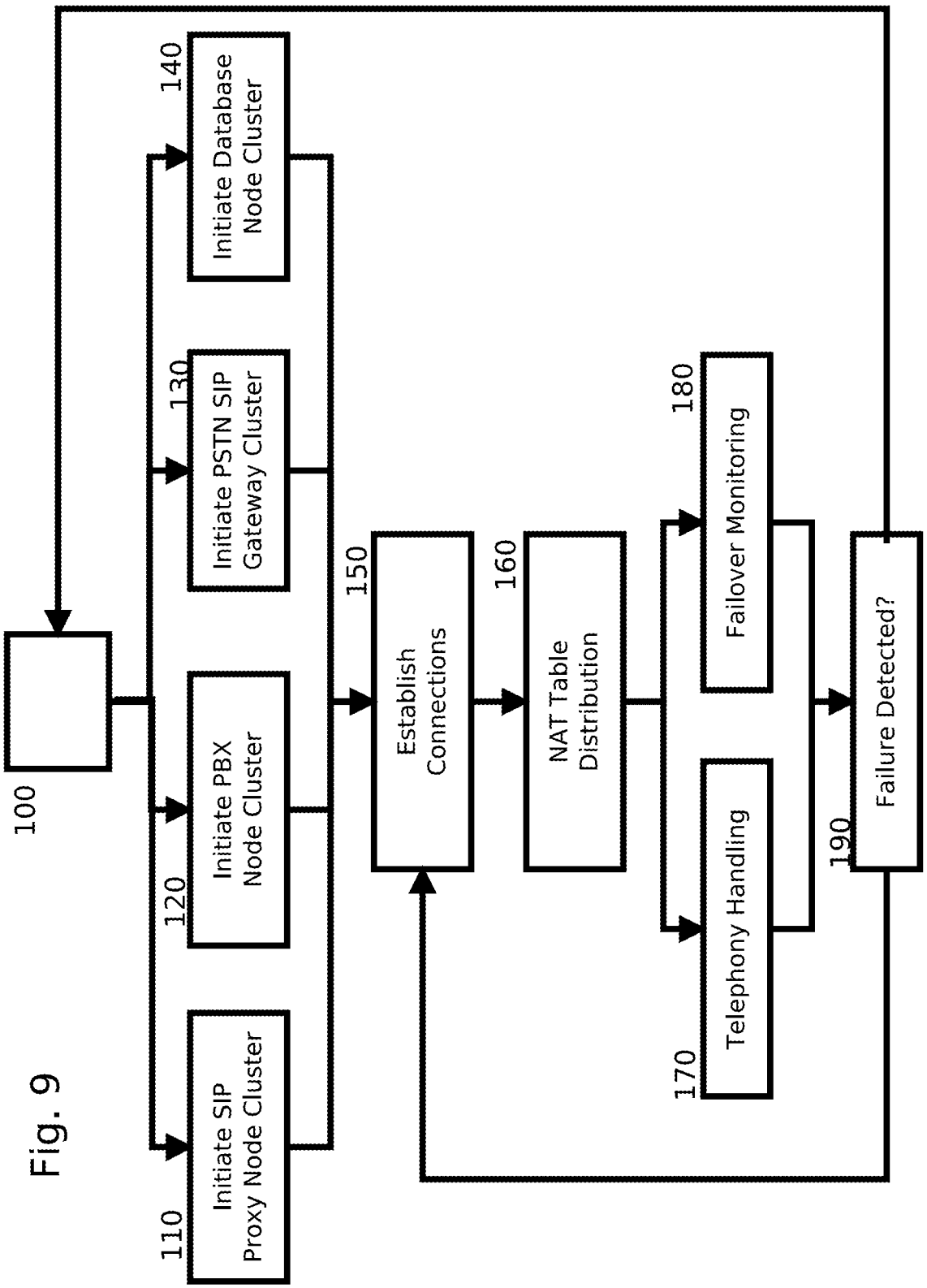
FIG. 9 depicts a diagram of an embodiment of a process according to the current invention as it may exist in operation.

An embodiment of a process 100 of the current invention is illustrated in FIG. 9. The configuration for one or more call cluster locales 10 is selected. One or more physically separated call cluster locales 10 may be deployed across multiple datacenters. A number of locations is chosen, with a higher number of locations presenting more failover locations and in turn decreasing failure risk. Other configuration details include the number of nodes in the clusters 20 30 40 50. Other configuration details include the type of instance deployed. For example, instances might be deployed to servers, virtual machines, containers, or the like.

At step 140, a database cluster 50 is initiated at the call cluster locale 10. Multiple instances of database nodes 52 are deployed to computers on servers, virtual machines, containers, or the like. For example, MySQL server may be deployed as the database instances. The database nodes 52 are placed in communication with each other over a network and a clustering mechanism is deployed to form the database cluster 50, replicating the data in each of the database nodes 52 across the database nodes 52, synchronizing them. For example, Galera Cluster may be employed as the cluster mechanism. The cluster mechanism is configured to monitor the database nodes' 52 services and restarts them if they become unavailable.

At step 110, the SIP proxy node cluster 40 is initiated at the call cluster locale 10. In doing so, multiple SIP proxy nodes 42 are deployed to computers on servers, virtual machines, containers, or the like. Database nodes 52 from the database cluster 50 are mounted for storage and retrieval of persistent call locale data from the database cluster 50 The SIP proxy nodes 42 are placed in communication with each other over a network and a clustering mechanism is deployed to form the SIP proxy node cluster 40, replicating the data across the SIP proxy nodes 42, synchronizing them. For example, Docker Swarm may be employed as the cluster mechanism. The cluster mechanism is configured to monitor the SIP proxy nodes' 42 services and restart them if they become unavailable.

At step 120, a PBX cluster 30 is initiated at the call cluster locale 10. Multiple instances of PBX nodes 32 are deployed to computers on servers, virtual machines, containers, or the like. For example, Asterisk may be deployed to containers as the PBX node 32 instances. The PBX nodes 32 are placed in communication with each other over a network and a clustering mechanism is deployed to form the PBX cluster 30, replicating the data in each of the PBX nodes 32 across the PBX nodes 32, synchronizing them. For example, Docker Swarm may be employed as the cluster mechanism. The cluster mechanism is configured to monitor the PBX node's 32 services and restarts them if they become unavailable. The cluster mechanism is configured to monitor the PBX nodes' 32 services and restart them if they become unavailable.

At step 130, a PSTN SIP gateway cluster 20 is initiated at the call cluster locale 10. Multiple instances of PSTN SIP gateway nodes 22 are deployed to computers on servers, virtual machines, containers, or the like. Database nodes 52 from the database cluster 50 are mounted for storage and retrieval of persistent data from the database cluster 50, such as PSTN call session and carrier communication. For example, Kamailio may be deployed to containers as the PSTN SIP gateway nodes 22 instances. The PSTN SIP gateway nodes 22 are placed in communication with each other over a network and a clustering mechanism is deployed to form the PSTN SIP gateway cluster 20, replicating the data in each of the PSTN SIP gateway nodes 22 across the PSTN SIP gateway nodes 22, synchronizing them. For example, Kamailio may be employed as the cluster mechanism. The cluster mechanism is configured to monitor the PSTN VOIP gateway nodes' 22 services and restarts them if they become unavailable.

At step 150, connection among the layers is established, as shown in FIGS. 1-3. The SIP proxy cluster 40, PBX cluster 30, PSTN SIP gateway cluster 20, and database cluster 50 are placed in communication over a network. A SIP proxy node 42 is placed in communication with one or more database nodes 52 in one or more database clusters 50 and the database clusters 50 is mounted. A PBX node 32 is placed in communication with one or more database nodes 52 in one or more database clusters 50 and the database clusters 50 is mounted. A PSTN SIP gateway node 22 is placed in communication with one or more database nodes 52 in one or more database clusters 50 and the database clusters 50 is mounted. A SIP proxy node 42 is placed in communication with one or more PBX nodes 32 in one or more PBX clusters 40. A PBX node 32 is placed in communication with one or more PSTN SIP gateway nodes 22 in one or more PSTN SIP gateway clusters 20. In exemplary process, every PBX node 32 is placed in communication with every PSTN SIP gateway nodes 22 at the cluster locale 10. A PSTN SIP gateway node 22 is placed in communication with one or more carriers. Telephones 80 are placed in communication with one or more SIP proxy clusters 40.

Additionally, SIP proxy cluster 40 records are deployed to the telephones 80 and the telephones are placed in communication with the SIP proxy nodes 42. Upon establishment of connection of telephones 80 to SIP proxy nodes 42, any persistent data telephone 80 or call session data from the mounted database node 52 is used to restore telephone 80, call features, and call state.

At step 160, NAT table addressing is distributed. In establishing connectivity 150, a NAT boundary is applied at the SIP proxy cluster 40 and the PSTN SIP gateway cluster 20. A NAT table of the first network to second network addressing translation exists as a result of the NAT addressing. The NAT table is distributed, such as to the PSTN SIP gateway cluster 20, PBX cluster 30, and SIP proxy cluster 40, facilitating communication among them.

Figure 10:
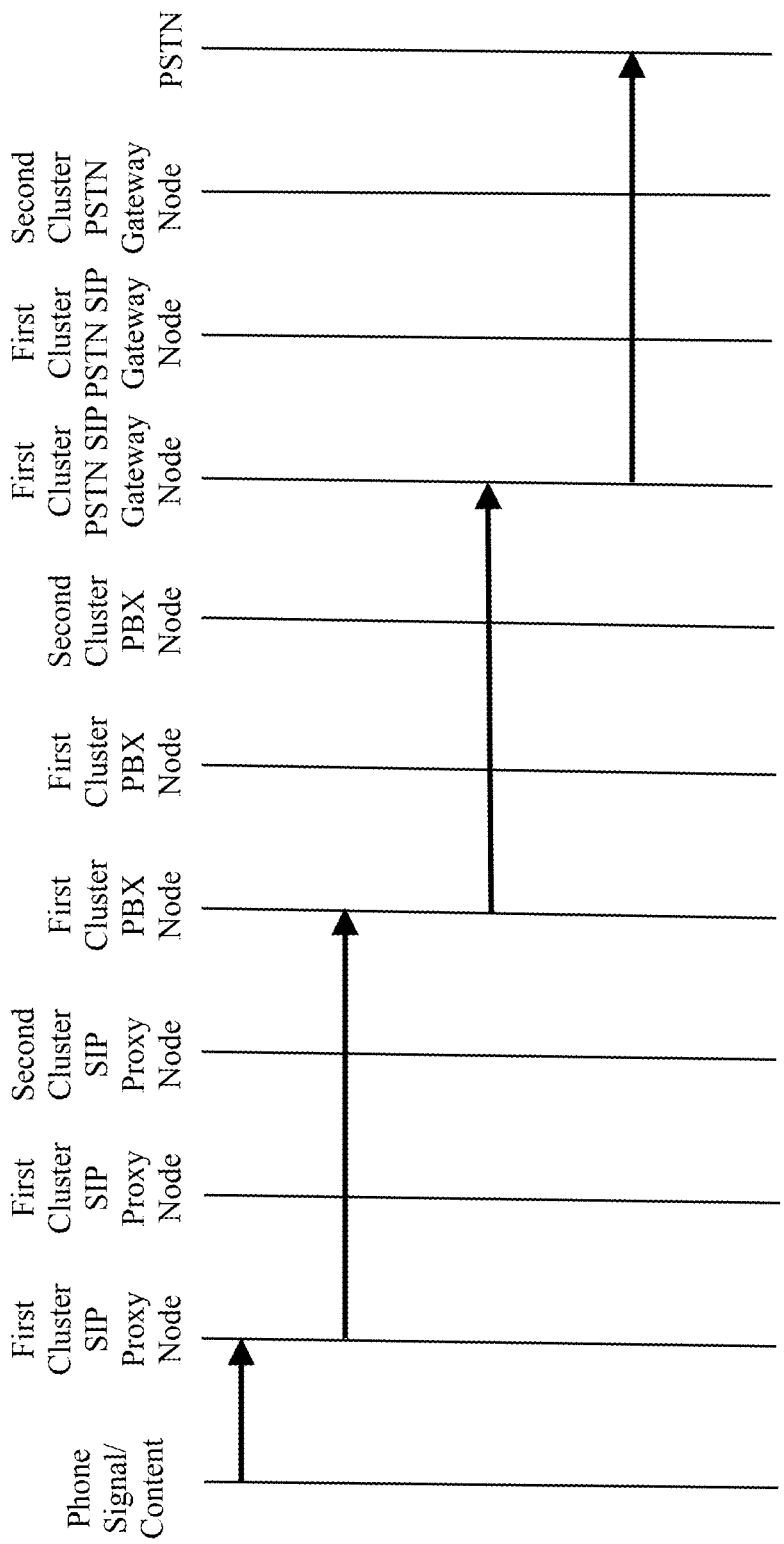
FIGS. 10 and 11 depict of representative call flow diagrams.

At steps 170 and 180, telephony operations are processed and failover is monitored. Telephony, such as administration, features, and calls are processed. FIG. 10 illustrates a call flow diagram for an internal VOIP to PSTN destination outbound call without any failover. A telephone 80 originates a call, which is registered at the first SIP proxy node 42 of a first SIP proxy node cluster 40 at the local call cluster center 10. That SIP proxy node 42 routes the call to the first PBX node 32 of the first PBX cluster 30 at the local call cluster center 10. That PBX node 32 routes the call to the first PSTN SIP node 22 of the first PSTN SIP cluster 20 at the local call cluster center 10, which in turn routes the call to a carrier, according to the cost routing table, in order least cost order, subject to availability of the carrier.

For a PSTN to internal VOIP telephone 80 destination inbound call, the carriers route the call to a PSTN SIP gateway node 22 within the PSTN SIP gateway cluster 20. If a PSTN SIP gateway node 22 doesn't respond within a threshold time, it's marked as offline, and the call is routed to another PSTN SIP gateway node 22 within the PSTN SIP gateway cluster 20.

As mentioned, failover might occur where power is out, network connectivity is lost, or the software become non-responsive. One of the failure monitoring processes 180 includes using the information from the NAT table distribution 160 and the PSTN SIP gateway nodes 22 periodically polling the PBX nodes 32. Where the PBX nodes 32 is unresponsive or does not respond with the correct messages, it is flagged a failed instance 190.

Figure 11:
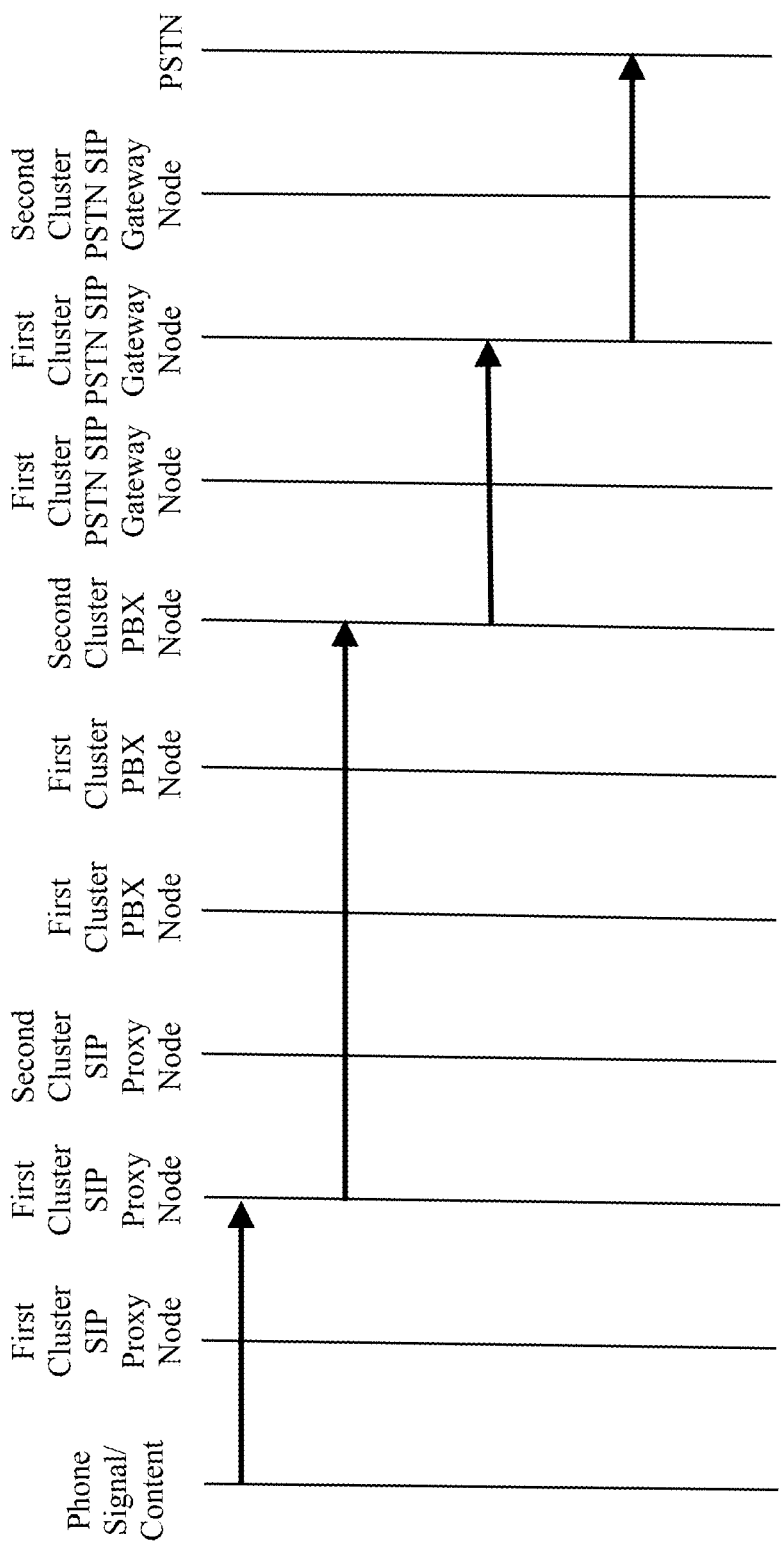

FIG. 11 illustrates a call flow diagram for an internal VOIP to PSTN destination outbound call where there is failover but prior to it being detected or a compensating number of nodes recreated. A telephone 80 originates a call, which is registered at the second SIP proxy node 42 of a first SIP proxy node cluster 40 at the local call cluster center 10. That SIP proxy node 42 routes the call to the first PBX node 32 of a second PBX cluster 30 at the local call cluster center 10. That PBX node 32 routes the call to a second PSTN SIP gateway node 22 of the first PSTN SIP cluster 20 at the local call cluster center 10, which in turn routes the call to a carrier, according to the cost routing table, in order least cost order, subject to availability of the carrier.

During a failure event 190 of a PBX node 32 due to network, CPU, error states, or other events, the PBX nodes 32 becomes unresponsive and is marked as unresponsive, where the instance may be destroyed. A new instance of a PBX node 32 is created 120, the new instance receiving new IP addresses 150, which creates a new entry in the NAT table 160, which upon polling triggers a transfer of state information from the database cluster 50, making it ready for operation to replace the failed node.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A system for voice over internet protocol (VOIP) to public switched telephone network (PSTN) at a call locale, said system comprising:

a VOIP proxy cluster in communication with a IP private branch exchange (PBX) cluster in communication with a PSTN VOIP gateway cluster;

a database cluster, said database cluster comprised of a plurality of database nodes operable to store and retrieve state of telephony operations, said database nodes in communication with each other over an applied cluster mechanism;

said VOIP proxy cluster comprised of a plurality of VOIP proxy nodes, each VOIP proxy node being an instance operable to proxy telephony from VOIP telephones, said VOIP proxy nodes in communication with each other and a clustering mechanism applied to said VOIP proxy cluster, replicating VOIP proxy node data, including at least one of telephony device data and VOIP session data, in each of said VOIP proxy nodes across said VOIP proxy nodes in said VOIP proxy cluster;

said PBX cluster comprised of a plurality of IP PBX nodes, each PBX node being an instance operable to act as central switching system for telephony within said call locale, said PBX nodes in communication with each other and a clustering mechanism applied to said PBX node cluster, replicating PBX node data, including call locale telephony data in each of said PBX nodes across said PBX nodes in said PBX cluster; and said PSTN VOIP gateway cluster comprised of a plurality of PSTN VOIP gateway nodes, each PSTN VOIP gateway node being an instance operable to bridge VOIP telephony at said call locale to PSTN telephony, said PSTN VOIP gateway nodes are in communication with each other and a clustering mechanism applied to said PSTN VOIP gateway cluster, replicating the PSTN VOIP gateway node data, including at least one of carrier telephone number data and carrier routing data, in each of said PSTN VOIP gateway nodes across said PSTN VOIP gateway node in said PSTN VOIP gateway cluster.

2. The system of claim 1, wherein said VOIP proxy nodes are configured to mount one or more database nodes from said database cluster, and store and retrieve persistent telephony data from said database cluster.

3. The system of claim 1, wherein said PBX nodes are configured to mount one or more database nodes from said database cluster, and store and retrieve persistent telephony data from said database cluster.

4. The system of claim 1, wherein said PSTN VOIP gateway nodes are configured to mount one or more database nodes from said database cluster, and store and retrieve persistent telephony data from said database cluster.

5. The system of claim 1, wherein said VOIP proxy nodes are configured to mount one or more database nodes from said database cluster, and store and retrieve persistent telephony data from said database cluster;

wherein said PSTN VOIP gateway nodes are configured to mount one or more database nodes from said database cluster, and store and retrieve persistent telephony data from said database cluster; and wherein said PSTN VOIP gateway nodes are configured to mount one or more database nodes from said database cluster, and store and retrieve persistent telephony data from said database cluster.

6. The system of claim 1, wherein a network address translation boundary is applied across said PSTN VOIP gateway cluster, said PSTN VOIP gateway node having first network interface for communication with said PBX cluster and a second network interface for communication with PSTN carriers.

7. The system of claim 1, wherein a network address translation boundary is applied across said SIP proxy cluster, said SIP proxy cluster nodes having first network interface for communication with said PBX cluster and a second network interface for communication with said telephones; and wherein a network address translation boundary is applied across said PSTN VOIP gateway cluster, said PSTN VOIP gateway node having first network interface for communication with said PBX cluster and a second network interface for communication with PSTN carriers.

8. The system of claim 7, wherein said PSTN VOIP gateway nodes are configured to mount one or more database nodes from said database cluster, and store and retrieve persistent telephony data from said database cluster.

9. The system of claim 7, wherein said VOIP proxy nodes are configured to mount one or more database nodes from said database cluster, and store and retrieve persistent telephony data from said database cluster.

10. The system of claim 7, wherein said VOIP proxy nodes are configured to mount one or more database nodes from said database cluster, and store and retrieve persistent telephony data from said database cluster;

wherein said PSTN VOIP gateway nodes are configured to mount one or more database nodes from said database cluster, and store and retrieve persistent telephony data from said database cluster; and wherein said PSTN VOIP gateway nodes are configured to mount one or more database nodes from said database cluster, and store and retrieve persistent telephony data from said database cluster.

11. A process for voice over internet protocol (VOIP) to public switched telephone network (PSTN) at a call locale, said process comprising the steps of:

creating a database cluster, said database cluster comprised of a plurality of database nodes operable to store and retrieve state of telephony operations, said database nodes in communication with each other over an applied cluster mechanism;

creating a VOIP proxy cluster comprised of a plurality of VOIP proxy nodes, each VOIP proxy node being an instance operable to proxy telephony from VOIP telephones, said VOIP proxy nodes in communication with each other and a clustering mechanism applied to said VOIP proxy cluster, replicating VOIP proxy node data, including at least one of telephony device data and VOIP session data, in each of said VOIP proxy nodes across said VOIP proxy nodes in said VOIP proxy cluster;

creating a PBX cluster comprised of a plurality of IP PBX nodes, each PBX node being an instance operable to act as central switching system for telephony within said call locale, said PBX nodes in communication with each other and a clustering mechanism applied to said PBX node cluster, replicating PBX node data, including call locale telephony data, in each of said PBX nodes across said PBX nodes in said PBX cluster; and creating a PSTN VOIP gateway cluster comprised of a plurality of PSTN VOIP gateway nodes, each PSTN VOIP gateway node being an instance operable to bridge VOIP telephony at said call locale to PSTN telephony, said PSTN VOP gateway nodes are in communication with each other and a clustering mechanism applied to said PSTN VOIP gateway cluster, replicating PSTN VOIP gateway node data, including at least one of carrier telephone number data and carrier routing data, in each of said PSTN VOIP gateway nodes across said PSTN VOIP gateway node in said PSTN VOIP gateway cluster; and placing said VOIP proxy cluster in communication with a IP private branch exchange (PBX) cluster in communication with a PSTN VOIP gateway cluster.

12. The process of claim 11, wherein said VOIP proxy nodes are configured to mount one or more database nodes from said database cluster, and store persistent telephony data from said database cluster.

13. The process of claim 11, wherein said VOIP proxy nodes are configured to mount one or more database nodes from said database cluster, and store and retrieve persistent telephony data from said database cluster;
   wherein said PSTN VOIP gateway nodes are configured to mount one or more database nodes from said database cluster, and store and retrieve persistent telephony data from said database cluster; and
   wherein said PSTN VOIP gateway nodes are configured to mount one or more database nodes from said database cluster, and store and retrieve persistent telephony data from said database cluster.

14. The process of claim 11, further providing a list of address records of said VOIP proxy nodes within said VOIP proxy cluster for transmission to said telephone.

15. The process of claim 11, further providing a list of address records of said PSTN VOIP gateway nodes within said PSTN VOIP gateway cluster for transmission to said carriers.

16. The process of claim 11, wherein a network address translation boundary is applied across said SIP proxy cluster, said SIP proxy cluster nodes having first network interface for communication with said PBX cluster and a second network interface for communication with said telephones; and
   wherein a network address translation boundary is applied across said PSTN VOIP gateway cluster, said PSTN VOIP gateway node having first network interface for communication with said PBX cluster and a second network interface for communication with PSTN carriers.

17. The process of claim 16, wherein said VOIP proxy nodes are configured to mount one or more database nodes from said database cluster, and store and retrieve persistent telephony data from said database cluster;
   wherein said PSTN VOIP gateway nodes are configured to mount one or more database nodes from said database cluster, and store and retrieve persistent telephony data from said database cluster; and
   wherein said PSTN VOIP gateway nodes are configured to mount one or more database nodes from said database cluster, and store and retrieve persistent telephony data from said database cluster.

18. The process of claim 16, further providing network address translation records of said network boundary of said VOIP proxy cluster to said PBX cluster.

19. The process of claim 18, wherein one of said PBX nodes within said PBX cluster polling the VOIP proxy cluster in said network address translation records for an unresponsive VOIP proxy node.

20. The process of claim 19, wherein in response to unresponsive VOIP proxy node, that node is destroyed, a new VOIP proxy node, state retrieved from the VOIP proxy cluster for said new proxy node, and its new address information added to the network address table.

* * * * *